(12) United States Patent
Burkman

(10) Patent No.: US 10,910,621 B2
(45) Date of Patent: Feb. 2, 2021

(54) ELECTRICAL MODULES WITH BUS BAR LOCATING AND SEPARATING FEATURES

(71) Applicant: FORD GLOBAL TECHNOLOGIES, LLC, Dearborn, MI (US)

(72) Inventor: Wesley Edward Burkman, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 249 days.

(21) Appl. No.: 16/189,178

(22) Filed: Nov. 13, 2018

(65) Prior Publication Data

US 2020/0152946 A1  May 14, 2020

(51) Int. Cl.
| | |
|---|---|
| *H01M 2/20* | (2006.01) |
| *H01M 2/10* | (2006.01) |
| *H01R 25/14* | (2006.01) |
| *B60L 58/21* | (2019.01) |

(52) U.S. Cl.
CPC ............ *H01M 2/202* (2013.01); *B60L 58/21* (2019.02); *H01M 2/1083* (2013.01); *H01R 25/14* (2013.01)

(58) Field of Classification Search
CPC ............ H01M 2/202–208; B60L 50/64; B60L 50/66; B60L 58/00–22
See application file for complete search history.

(56) References Cited

U.S. PATENT DOCUMENTS

| | | | |
|---|---|---|---|
| 5,643,693 A | 7/1997 | Hill et al. | |
| 6,545,861 B1 | 4/2003 | Hayes et al. | |
| 7,499,262 B1 | 3/2009 | Darr | |
| 2012/0212232 A1* | 8/2012 | Ikeda ............... | H01M 2/206 324/426 |
| 2012/0244398 A1 | 9/2012 | Youngs et al. | |

FOREIGN PATENT DOCUMENTS

| | | |
|---|---|---|
| DE | 102015225249 A1 | 6/2016 |
| WO | 2011/052699 A1 | 5/2011 |

* cited by examiner

*Primary Examiner* — Stephan J Essex
(74) *Attorney, Agent, or Firm* — David B. Kelley; Carlson, Gaskey & Olds

(57) ABSTRACT

This disclosure details electrical modules that include integrated bus bar locating and separating features. An exemplary electrical module may include a first housing, a second housing, and a bus bar coupon. The first housing, the second housing, or both may include one or more locating and separating features. The bus bar coupon may be automatically separated into a plurality of individual bus bars by the separating features as the first and second housings of the electrical module are moved together. The electrical module could be utilized within electrified vehicle battery packs or various other electrified components.

15 Claims, 7 Drawing Sheets

ELECTRICAL MODULES WITH BUS BAR LOCATING AND SEPARATING FEATURES

TECHNICAL FIELD

This disclosure relates to electrical modules, and more particularly to electrical modules that include one or more bus bar locating and separating features. The electrical modules may be used within electrified vehicle battery packs, for example.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of battery cells that may be arranged in one or more battery arrays. The battery pack may additionally include one or more electrical modules as part of a power distribution system for distributing power to and from the battery arrays and to and from the battery pack.

SUMMARY

A vehicle electrical module according to an exemplary aspect of the present disclosure includes, among other things, a first housing, a second housing, and a bus bar coupon between the first and second housings. The first housing or the second housing includes a separating spike configured to separate portions of the bus bar coupon as the first and second housings are moved together.

In a further non-limiting embodiment of the foregoing vehicle electrical module, the vehicle electrical module is a junction box of an electrified vehicle battery pack.

In a further non-limiting embodiment of either of the foregoing vehicle electrical modules, the first housing and the second housing are plastic components and the bus bar coupon is a metallic component.

In a further non-limiting embodiment of any of the foregoing vehicle electrical modules, the separating spike includes a knife edge.

In a further non-limiting embodiment of any of the foregoing vehicle electrical modules, the separating spike protrudes from an exterior surface of the first housing or the second housing.

In a further non-limiting embodiment of any of the foregoing vehicle electrical modules, a locating boss protrudes from either the first housing or the second housing and extends into an opening formed in the other of the first housing or the second housing.

In a further non-limiting embodiment of any of the foregoing vehicle electrical modules, the locating boss extends through an opening of the bus bar coupon.

In a further non-limiting embodiment of any of the foregoing vehicle electrical modules, the separating spike is configured to shear a carrier that connects a first bus bar and a second bus bar of the bus bar coupon.

In a further non-limiting embodiment of any of the foregoing vehicle electrical modules, prior to moving the first housing and the second housing together, the first bus bar and the second bus bar are connected by the carrier, and after moving the first housing and the second housing together, the first bus bar and the second bus bar are unconnected by the carrier.

In a further non-limiting embodiment of any of the foregoing vehicle electrical modules, the first housing is a lower housing and the second housing in an upper housing, and the separating spike is part of the lower housing.

In a further non-limiting embodiment of any of the foregoing vehicle electrical modules, the first housing is a lower housing and the second housing is an upper housing, and the separating spike is part of the upper housing.

In a further non-limiting embodiment of any of the foregoing vehicle electrical modules, a second separating spike is adjacent to the separating spike and configured to separate the portions of the bus bar coupon.

In a further non-limiting embodiment of any of the foregoing vehicle electrical modules, at least a portion of the separating spike is accommodated within a recess of the first housing or the second housing.

In a further non-limiting embodiment of any of the foregoing vehicle electrical modules, a locating boss extends a first distance from an exterior surface of the first housing, and the separating spike extends a second distance from the exterior surface. The second distance is a smaller distance than the first distance.

In a further non-limiting embodiment of any of the foregoing vehicle electrical modules, the bus bar coupon includes a plurality of individual bus bars and a plurality of carriers that connect the plurality of individual bus bars.

A method according to another exemplary aspect of the present disclosure includes, among other things, positioning a bus bar coupon relative to a first housing of an electrical module, moving the first housing and a second housing of the electrical module together to assemble the electrical module, and separating a plurality of individual bus bars of the bus bar coupon from one another as the first and second housings are moved together.

In a further non-limiting embodiment of the foregoing method, positioning the bus bar coupon includes receiving a locating boss of the first housing within an opening of the bus bar coupon.

In a further non-limiting embodiment of either of the foregoing methods, separating the plurality of individual bus bars of the bus bar coupon includes shearing a carrier that extends between a first bus bar and a second bus bar of the plurality of individual bus bars with a separating spike of the first housing.

In a further non-limiting embodiment of any of the foregoing methods, prior to the moving, the individual bus bars are connected by carriers of the bus bar coupon, and, after the moving, the individual bus bars are unconnected by the carriers.

In a further non-limiting embodiment of any of the foregoing methods, the method includes inserting a mandrel through openings of the first housing and the second housing to completely separate the plurality of individual bus bars.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details electrical modules that include integrated bus bar locating and separating features. An exemplary electrical module may include a first housing, a second housing, and a bus bar coupon. The first housing, the second housing, or both may include one or more locating and separating features. The bus bar coupon may be automatically separated into a plurality of individual bus bars by the separating features as the first and second housings of the electrical module are moved together. The electrical module could be utilized within electrified vehicle battery packs or various other electrified components. These and other features are discussed in greater detail in the following paragraphs of this detailed description.

Figure 1:
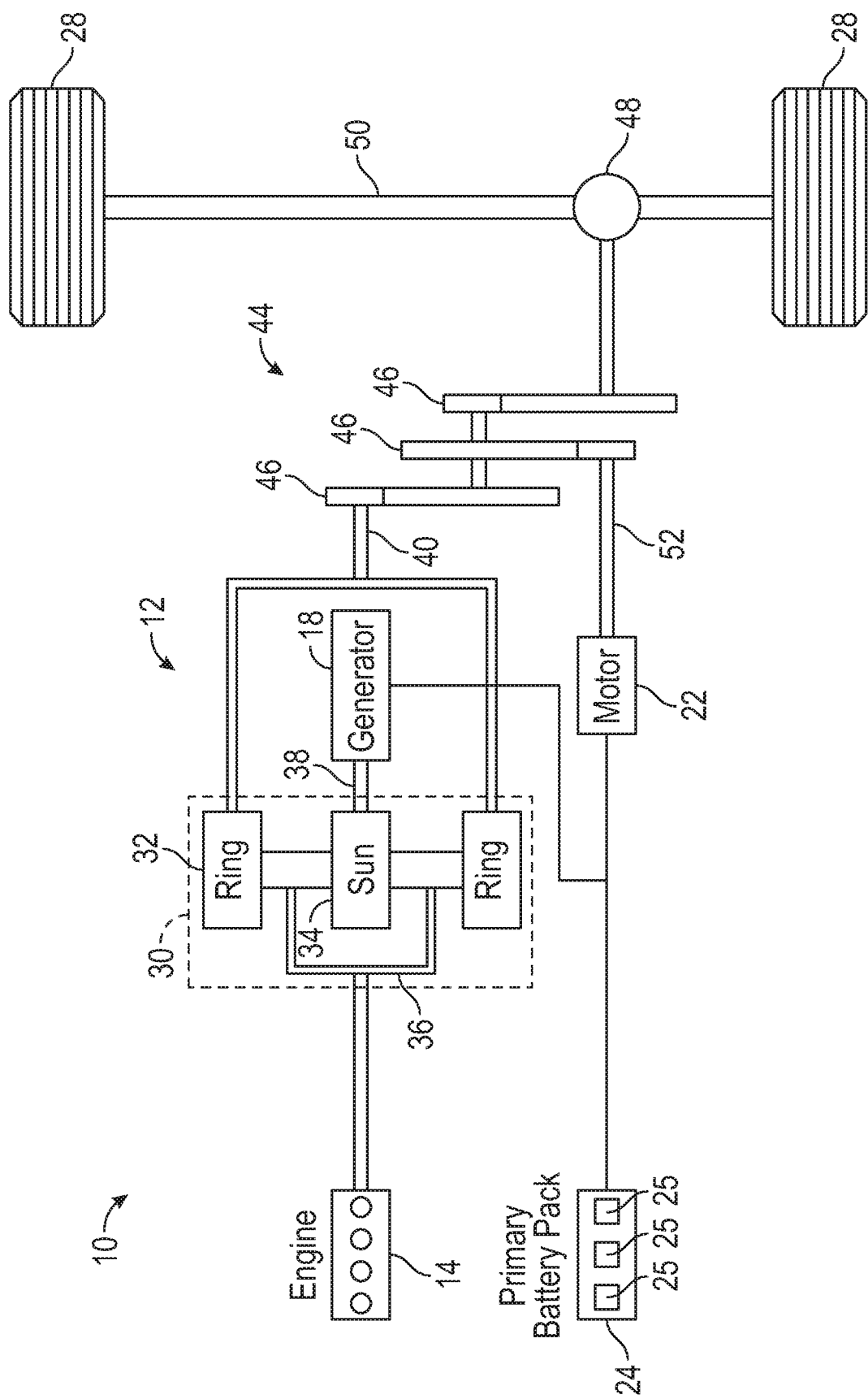
FIG. 1 schematically illustrates an electrified vehicle.

FIG. 1 schematically illustrates a powertrain 10 of an electrified vehicle 12. In an embodiment, the powertrain 10 is a powertrain of a hybrid electric vehicle (HEV). However, although depicted in an embodiment as a HEV, the concepts described herein could extend to other electrified vehicles, including, but not limited to, plug-in hybrid electric vehicles (PHEVs), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In an embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In an embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In an embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes one or more battery arrays 25 (i.e., battery assemblies or groupings of battery cells) that are capable of outputting electrical power to operate the motor 22, the generator 18, and/or other electrical loads of the electrified vehicle 12 for providing power to propel the drive wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
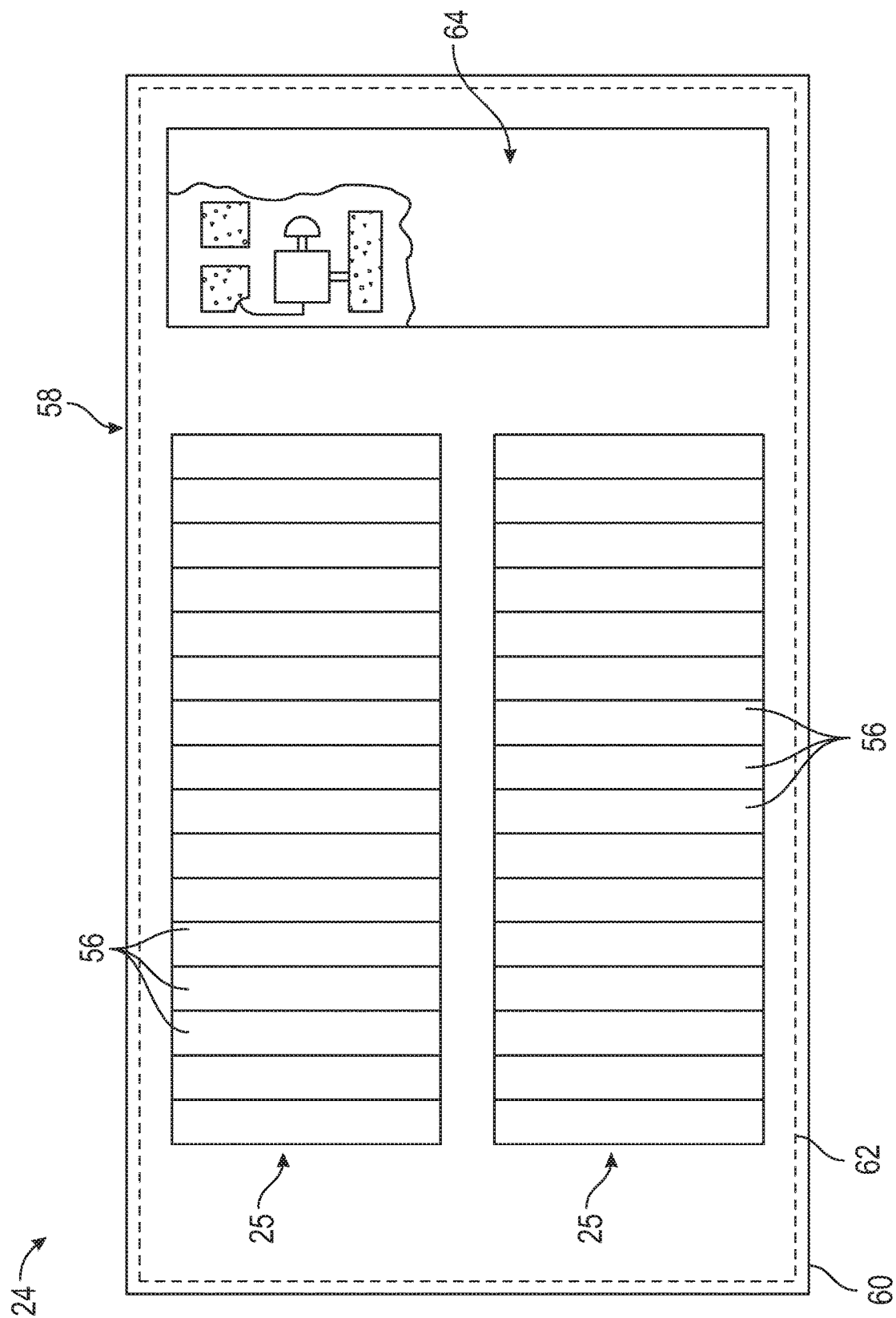
FIG. 2 illustrates a battery pack of an electrified vehicle.

FIG. 2 schematically illustrates portions of a battery pack 24 that can be employed within an electrified vehicle, such as the electrified vehicle 12 of FIG. 1. The battery pack 24 is one example of an electrified component that could benefit from the teachings of this disclosure. However, this disclosure is not limited to battery packs, and the teachings of this disclosure could extend to various electrified components that are designed to distribute power.

The battery pack 24 may house a plurality of battery cells 56 that store energy for powering various electrical loads of the electrified vehicle 12. The battery pack 24 could employ any number of battery cells 56 within the scope of this disclosure. Accordingly, this disclosure is not limited to the exact configuration shown in FIG. 2.

The battery cells 56 may be stacked side-by-side along one or more stack longitudinal axes to construct groupings of battery cells 56, sometimes referred to as a "cell stacks" or "cell arrays." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56 of each grouping, along with any support structures (e.g., array frames, spacers, rails, walls, plates, bindings, etc.), may collectively be referred to as a battery assembly or a battery array 25. The battery pack 24 depicted in FIG. 2 includes two battery arrays 25; however, the battery pack 24 could include a greater or fewer number of battery arrays and still fall within the scope of this disclosure. Again, this disclosure is not limited to the specific configuration shown in FIG. 2.

An enclosure assembly 58 may house each battery array 25 of the battery pack 24. The enclosure assembly 58 may be a sealed housing that includes a tray 60 and a cover 62 (shown in phantom to better illustrate the internal contents of the battery pack 24). The enclosure assembly 58 may include any size, shape, and configuration within the scope of this disclosure.

One or more electrical modules 64 may also be housed inside the enclosure assembly 58 of the battery pack 24. The electrical module(s) 64 could be part of a power distribution system of the battery pack 24. In an embodiment, the electrical module(s) 64 is/are positioned adjacent to the battery arrays 25 and could be mounted to one or more of the walls of the enclosure assembly 58. The specific arrangement of the electrical module 64 and the battery arrays 25 shown in FIG. 2 is but one non-limiting example of how the various components of the battery pack 24 could be arranged and is not intended to limit this disclosure.

In an embodiment, the electrical module 64 is a high voltage (HV) junction box of the battery pack 24. In another embodiment, the electrical module 64 is a low voltage (LV) junction box of the battery pack 24. In yet another embodiment, the electrical module 64 is configured as a bussed electrical center (BEC) of the battery pack 24. The electrical module 64 could be a power distribution unit of any electrified component.

Figure 3:
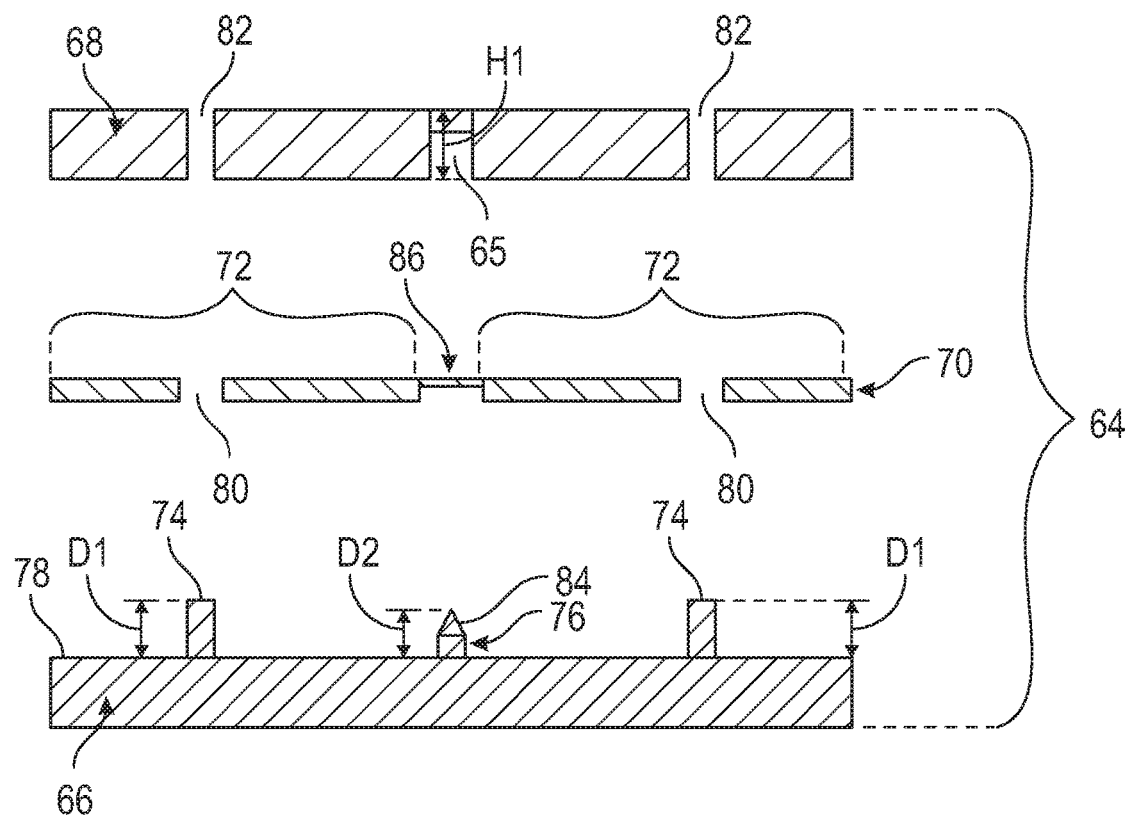
FIG. 3 is an exploded view of an electrical module of a battery pack. The electrical module is shown prior to completing assembly.
Figure 4:
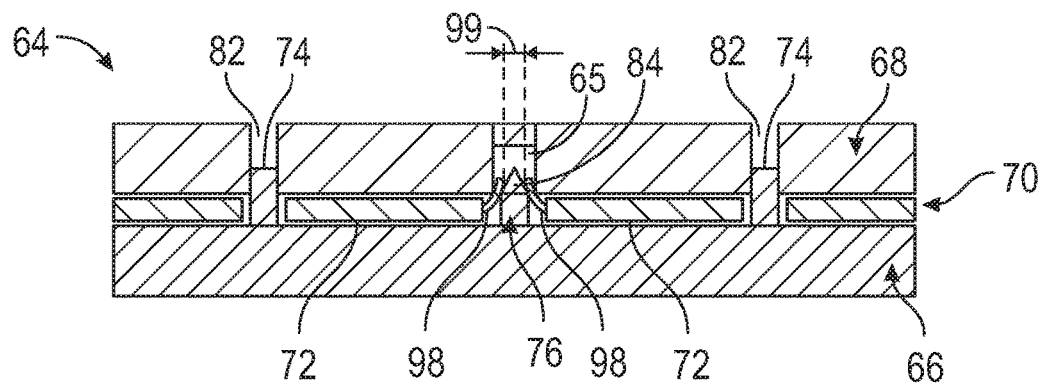
FIG. 4 is an assembled view of the electrical module of FIG. 3. The electrical module is shown after completing assembly.

FIGS. 3 and 4 illustrate an exemplary electrical module 64. The electrical module 64 is shown prior to assembly in FIG. 3 and is shown after assembly in FIG. 4. The electrical module 64 may include a first (or lower) housing 66, a second (or upper) housing 68, and a bus bar coupon 70. Each of these components is further detailed below.

The first housing 66 and the second housing 68 may be plastic housing components that are configured to provide mounting surfaces for mounting the various components of the electrical module 64. In addition, the first housing 66, the second housing 68, or both may include various locating and separating features for both locating and separating individual bus bars 72 of the bus bar coupon 70 within the electrical module 64.

In the embodiment depicted in FIGS. 3-4, for example, the first housing 66 includes one or more locating bosses 74 for locating the bus bar coupon 70 within the electrical module 64 and one or more separating spikes 76 for separating the individual bus bars 72 of the bus bar coupon 70 as the first and second housings 66, 68 are moved (e.g., pressed) together. The locating bosses 74 and the separating spikes 76 may protrude from an exterior surface 78 of the first housing 66 in a direction toward the second housing 68.

During assembly, the locating bosses 74 may be received through openings 80 (see FIGS. 3 and 5) of the bus bar coupon 70 to properly locate the bus bar coupon 70 within the electrical module 64. The locating bosses 74 may additionally be received within openings 82 formed in the second housing 68 to help retain the first and second housings 66, 68 to one another. Although not shown, the first and second housings 66, 68 could include features that enable the first housing 66 and the second housing 68 to be located, snapped, or clipped together.

Each separating spike 76 may include a knife edge 84. As discussed in greater detail below, the knife edges 84 are designed to separate (e.g., by shearing) the plurality of individual bus bars 72 during assembly of the electrical module 64. Once the first housing 66 and the second housing 68 have been moved together, the separating spikes 76 may be at least partially accommodated within a recess 65 formed in the second housing 68.

In an embodiment, the locating bosses 74 protrude a first distance D1 from the exterior surface 78 of the first housing, and the separating spikes 76 protrude a second distance D2 from the exterior surface 78 (see FIG. 3). The second distance D2 may be a smaller distance than the first distance D1. This configuration allows the bus bar coupon 70 to be properly positioned relative to the first housing 66 before the separating spikes 76 interfere with the proper alignment.

Figure 5:
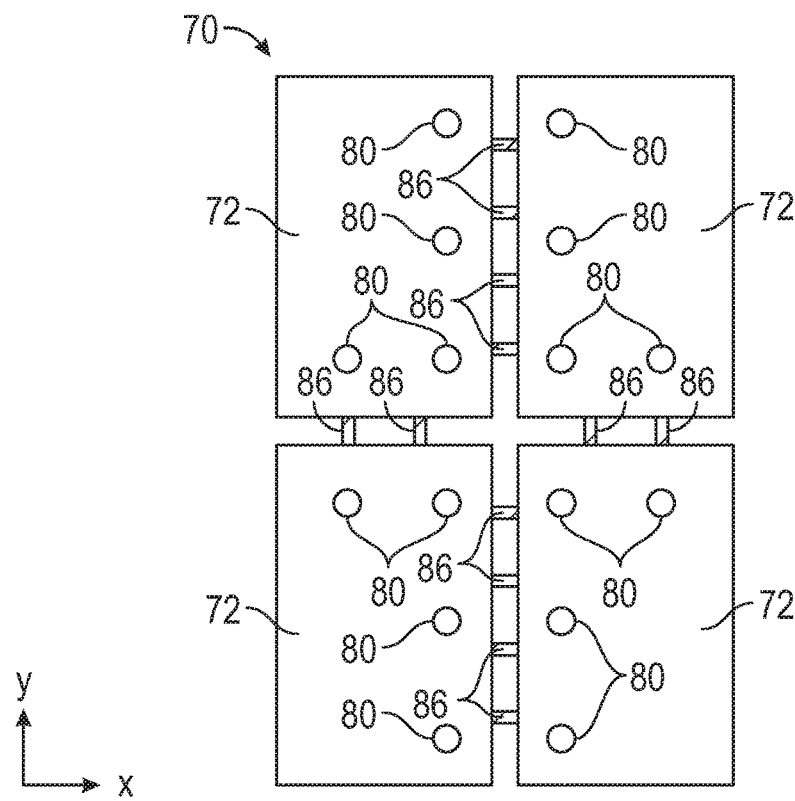
FIG. 5 illustrates a bus bar coupon of the electrical module of FIG. 3.

Referring now to FIGS. 3 and 5, the bus bar coupon 70 may include the plurality of individual bus bars 72 and a plurality of carriers 86 that connect between the plurality of individual bus bars 72. Prior to assembly of the electrical module 64, the carriers 86 connect the individual bus bars 72 together as a single unit. The total number of bus bars 72 and carriers 86 making up the bus bar coupon 70 is design dependent and thus not intended to limit this disclosure.

In an embodiment, the second housing 68 includes a height H1. The height H1 may be larger than a length of the carriers 86 in order to keep severed sections of the carriers 86 from protruding outside of the second housing 68.

The X-Y Cartesian coordinates of each of the individual bus bars 72 may be designed to match the X-Y Cartesian location at which the individual bus bars 72 will be positioned relative to the first and second housings 66, 68. In addition, the X-Y Cartesian coordinates of the openings 80 of each of the individual bus bars 72 may be designed to match the X-Y Cartesian location of the locating bosses 74.

In an embodiment, the bus bar coupon 70 is a stamped component that can be positioned within the electrical module 64 as a single unit rather than requiring the placement of each bus bar 72 individually. The bus bar coupon 70 may therefore reduce assembly complexities associated with assembling the electrical module 64.

The individual bus bars 72 of the bus bar coupon 70 may be relatively thin strips of metal that are configured to conduct power. Example bus bar materials include copper, brass, or aluminum, although other conductive materials may also be suitable. In an embodiment, the individual bus bars 72 are high current bus bars having relatively high amperage capacities. The carriers 86 of the bus bar coupon 70 may be made of the same materials as the individual bus bars 72.

Figure 6:
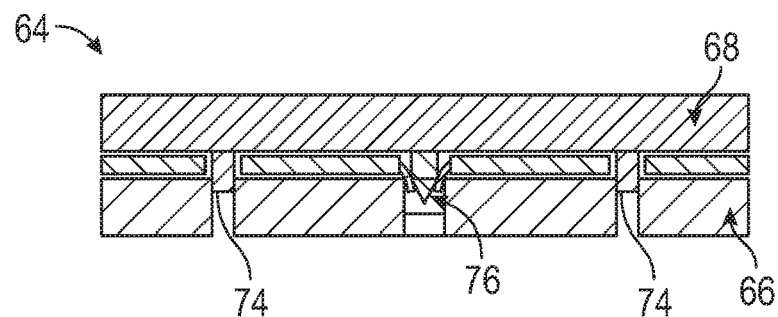
FIG. 6 illustrates another exemplary electrical module.
Figure 7:
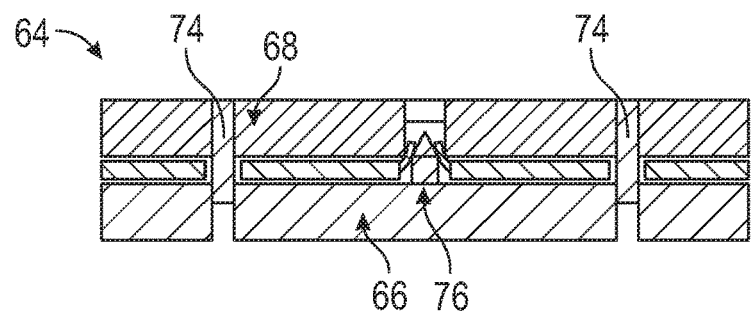
FIG. 7 illustrates yet another exemplary electrical module.

Although a specific bus bar locating and separating configuration is described above, other configurations are also contemplated within the scope of this disclosure. For example, in another embodiment, the locating bosses 74 and the separating spikes 76 of the electrical module 64 are part of the second housing 68 (see, e.g., FIG. 6). In yet another embodiment, the first housing 66 includes one or more separating spikes 76 and the second housing 68 includes one or more locating bosses 74 (see, e.g., FIG. 7). The total numbers, locations, and configurations of the locating bosses 74 and separating spikes 76 provided within the electrical module 64 are not intended to limit this disclosure.

Figure 8:
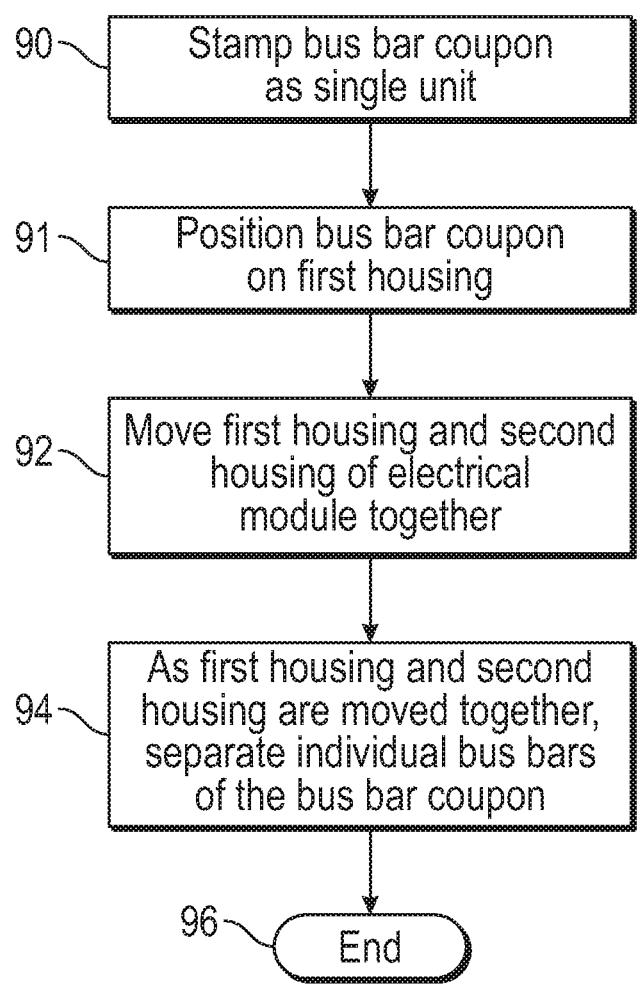
FIG. 8 schematically illustrates a method of assembling an electrical module.

FIG. 8, with continued reference to FIGS. 3-5, schematically illustrates an exemplary method 88 for assembling the electrical module 64. First, at block 90, the bus bar coupon 70 may be stamped as a single unit that includes the plurality of individual bus bars 72 that are connected by the carriers 86.

Next, at block 91, the bus bar coupon 70 may be placed on the first housing 66. The bus bar coupon 70 may be properly located by aligning the bus bar coupon 70 such that the openings 80 formed in the individual bus bars 72 align with the locating bosses 74. The bus bar coupon 70 may then be moved further toward the first housing 66 until the locating bosses 74 are received through the openings 80 and the separating spikes 76 come into contact with the carriers 86 of the bus bar coupon 70.

The first housing 66 and the second housing 68 may be moved (e.g., pressed) together at block 92. During block 92, the first housing 66 may be moved toward the second housing 68, the second housing 68 may be moved toward the first housing 66, or both the first housing 66 and the second housing 68 may be moved toward one another. The locating bosses 74 may be received within the openings 82 of the second housing 68 as the first housing 66 and the second housing 68 are moved together.

As the first housing 66 and the second housing 68 are moved together, the separating spikes 76 are moved into further contact with the carriers 86 of the bus bar coupon 70. As this occurs, the knife edges 84 of the separating spikes 76 may sever (e.g., shear) the carriers 86, thereby separating the individual bus bars 72 of the bus bar coupon 70 from one another (see block 94). The method 88 may then end at block 96.

As best shown in FIG. 4, the separating spikes 76 are configured to create a gap 99 between severed sections 98 of each carrier 86. When in the presence of humidity and debris (e.g. dust), the high voltage differential that may be present between two bus bars 72 may cause an undesirable conductive path to form between the bus bars 72. This phenomenon may be referred to as "creepage" and can lead to an undesired loss of isolation between the two bus bars 72. The gap 99 may be large enough to prevent this creepage between the conductive surfaces of the severed sections 98 of each carrier 86. In an embodiment, the gap 99 is between about 8 mm (0.315 inches) and about 10 mm (0.394 inches).

Figure 9:
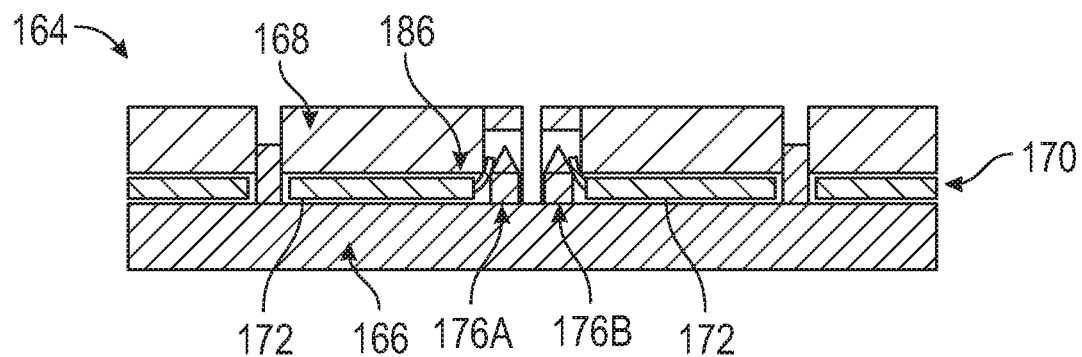
FIG. 9 illustrates yet another exemplary electrical module.

FIG. 9 illustrates another exemplary electrical module 164. The electrical module 164 is similar to the electrical modules 64 discussed above and depicted in FIGS. 3-7 and includes a first housing 166, a second housing 168, and a bus bar coupon 170. However, in this embodiment, the electrical module 164 may include multiple separating spikes 176A, 176B for shearing each carrier 186 of the bus bar coupon 170, thereby separating the individual bus bars 172 of the bus bar coupon 170. The multiple separating spike arrangement shown in FIG. 9 may be appropriate, for example, when the carriers 186 of the bus bar coupon 170 include a relatively large length.

Figure 10:
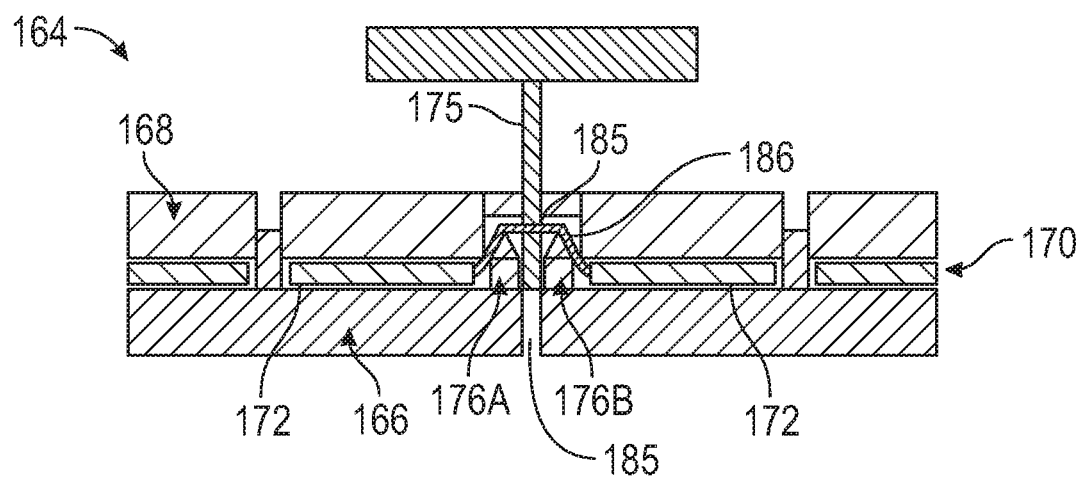
FIG. 10 schematically illustrates an exemplary step of a method for assembling the electrical module of FIG. 9.

The electrical module 164 of FIG. 9 may be assembled in the manner shown in FIG. 8. However, an additional step may be required to ensure that the carriers 186 are completely sheared during the assembly method. For example, as shown in FIG. 10, the assembly method may additionally include inserting a mandrel 175 through openings 185 of the first housing 166 and the second housing 168 in order to ensure that the carriers 186 are completely severed. In an embodiment, the mandrel 175 is moved as part of a press operation that occurs after moving the first housing 166 and the second housing 168 into engagement with one another.

Figure 11:
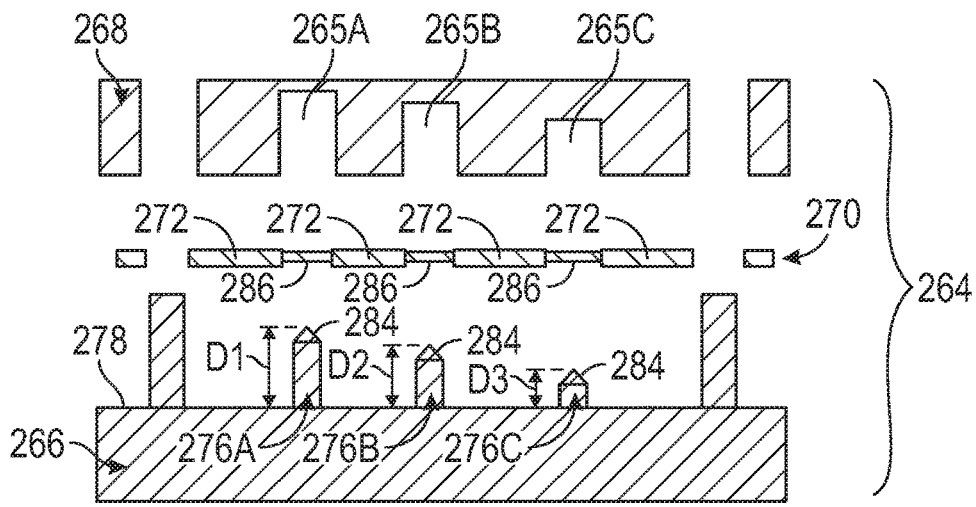
FIG. 11 illustrates yet another exemplary electrical module.

FIG. 11 illustrates another exemplary electrical module 264. The electrical module 264 is similar to the electrical modules discussed above and may include a first housing 266, a second housing 268, and a bus bar coupon 270. However, in this embodiment, the electrical module 264 may include multiple separating spikes 276A, 276B, and 276C for shearing each carrier 286 of the bus bar coupon 270, thereby separating the individual bus bars 272 of the bus bar coupon 270. The total number of separating spikes of the electrical module 264 is not intended to limit this disclosure. The multiple separating spike arrangement shown in FIG. 11 may be appropriate, for example, when the quantity of the carriers 286 is too high to be sheared in a single motion by assembling the first and second housings 266, 268.

Each separating spike 276A, 276B, and 276C may include a knife edge 284. The knife edges 284 are configured to separate (e.g., by shearing) the plurality of individual bus bars 272 during assembly of the electrical module 264. Once the first housing 266 and the second housing 268 have been moved together, the separating spikes 276A, 276B, and 276C may be at least partially accommodated within respective recesses 265A, 265B, and 265C of the second housing 268. The recesses 265A, 265B, and 265C may be dimensioned to accommodate the separating spikes 276A, 276B, and 276C, respectively.

In an embodiment, the separating spike 276A protrudes a first distance D1 from an exterior surface 278 of the first housing 266, the separating spike 276B protrudes a second distance D2 from the exterior surface 278, and the separating spike 276C protrudes a third distance D3 from the exterior surface 278. The first distance D1 may be larger than the second distance D2, and the second distance D2 may be larger than the third distance D3. This configuration allows each of the separating spikes 276A, 276B, and 276C to interact with the bus bar coupon 270 at a different time, thereby shearing the carriers 286 sequentially, or one at a time.

Figure 12A:
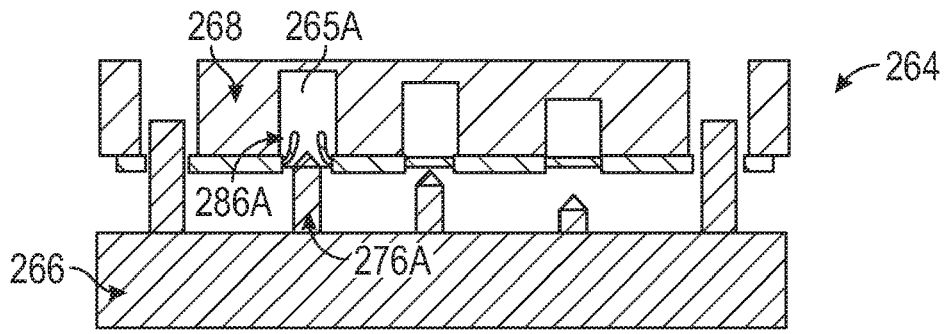
FIGS. 12A, 12B, and 12C illustrate an exemplary method for assembling the electrical module of FIG. 11.
Figure 12B:
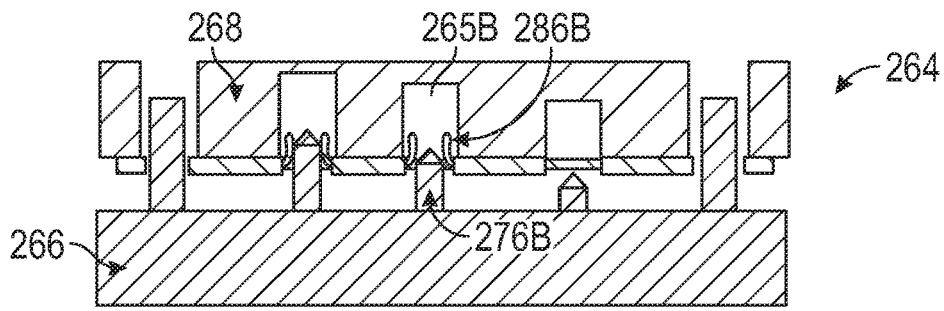
Figure 12C:
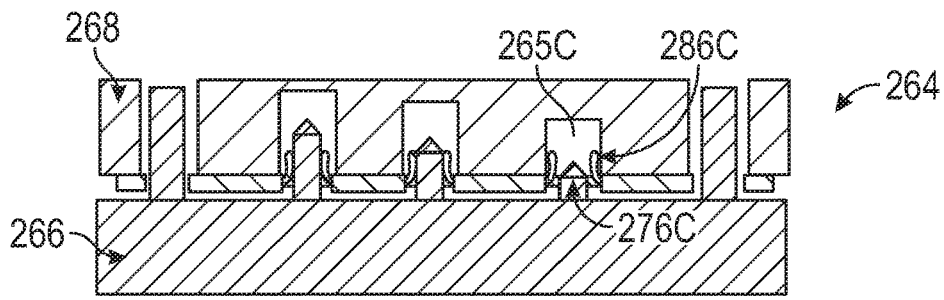

The electrical module 264 of FIG. 11 may be assembled in the manner shown in FIGS. 12A-12C. FIGS. 12A-12C schematically illustrate three sequential steps of an exemplary method for assembling the electrical module 264. As shown at FIG. 12A, the separating spike 276A may sever a first carrier 286A as the first housing 266 and the second housing 268 are moved together. Subsequently, as shown in FIG. 12B, the separating spike 276B may sever a second carrier 286B as the second housing 266 and the first housing 268 are moved further together. Subsequently, as shown in FIG. 12C, the separating spike 276C may sever a third carrier 286C as the second housing 266 and the first housing 268 are moved even further together.

The exemplary electrical modules of this disclosure enable the placement of multiple bus bars within the module in a single step. Dedicated bus bar separation stations may therefore be eliminated from the assembly line. Therefore, a significant portion of the assembly process can be either eliminated or combined into a single manufacturing step by utilizing the bus bar locating and separating features of this disclosure.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle electrical module, comprising:
a first housing;
a second housing; and
a bus bar coupon between the first and second housings,
wherein the first housing or the second housing includes a separating spike configured to separate portions of the bus bar coupon as the first and second housings are moved together.

2. The vehicle electrical module as recited in claim 1, wherein the vehicle electrical module is a junction box of an electrified vehicle battery pack.

3. The vehicle electrical module as recited in claim 1, wherein the first housing and the second housing are plastic components and the bus bar coupon is a metallic component.

4. The vehicle electrical module as recited in claim 1, wherein the separating spike includes a knife edge.

5. The vehicle electrical module as recited in claim 1, wherein the separating spike protrudes from an exterior surface of the first housing or the second housing.

6. The vehicle electrical module as recited in claim 1, comprising a locating boss protruding from either the first housing or the second housing and extending into an opening formed in the other of the first housing or the second housing.

7. The vehicle electrical module as recited in claim 6, wherein the locating boss extends through an opening of the bus bar coupon.

8. The vehicle electrical module as recited in claim 1, wherein the separating spike is configured to shear a carrier that connects a first bus bar and a second bus bar of the bus bar coupon.

9. The vehicle electrical module as recited in claim 8, wherein, prior to moving the first housing and the second housing together, the first bus bar and the second bus bar are connected by the carrier, and after moving the first housing and the second housing together, the first bus bar and the second bus bar are unconnected by the carrier.

10. The vehicle electrical module as recited in claim 1, wherein the first housing is a lower housing and the second housing is an upper housing, and the separating spike is part of the lower housing.

11. The vehicle electrical module as recited in claim 1, wherein the first housing is a lower housing and the second housing is an upper housing, and the separating spike is part of the upper housing.

12. The vehicle electrical module as recited in claim 1, comprising a second separating spike adjacent to the separating spike and configured to separate the portions of the bus bar coupon.

13. The vehicle electrical module as recited in claim 1, wherein at least a portion of the separating spike is accommodated within a recess of the first housing or the second housing.

14. The vehicle electrical module as recited in claim 1, comprising a locating boss extending a first distance from an exterior surface of the first housing, and the separating spike extends a second distance from the exterior surface, wherein the second distance is a smaller distance than the first distance.

15. The vehicle electrical module as recited in claim 1, wherein the bus bar coupon includes a plurality of individual bus bars and a plurality of carriers that connect the plurality of individual bus bars.

* * * * *